US005276986A

United States Patent [19]

Thomas

[11] Patent Number: 5,276,986
[45] Date of Patent: Jan. 11, 1994

[54] DEVICE FOR DISPLAYING INDICIA AND METHODS FOR ITS USE

[76] Inventor: Joseph P. Thomas, 12 Kings Pkwy., Ledgewood, N.J. 07852

[21] Appl. No.: 794,422

[22] Filed: Nov. 19, 1991

[51] Int. Cl.⁵ .............................................. G09F 3/18
[52] U.S. Cl. ...................................... 40/336; 379/447
[58] Field of Search ................ 40/336, 337, 339, 371, 40/338; 248/918, 442.2, 444.1, 300, 223.4, 225.1; 379/447, 450, 452, 428, 432

[56] References Cited

U.S. PATENT DOCUMENTS

| | | | |
|---|---|---|---|
| 2,498,770 | 2/1950 | Sloane et al. | 379/447 |
| 2,624,965 | 1/1953 | Griswold | 379/450 |
| 2,795,877 | 6/1957 | Falk | 40/120 |
| 2,981,021 | 4/1961 | Clark | 40/336 |
| 3,272,531 | 9/1966 | Krauth, Jr. | 379/450 |
| 3,518,783 | 7/1970 | Foley | 40/336 |
| 4,142,312 | 3/1979 | Stokes | 379/432 |
| 4,283,037 | 8/1981 | Bindman | 379/447 |
| 4,937,877 | 6/1990 | Pocock et al. | 379/432 |

FOREIGN PATENT DOCUMENTS

1031012  6/1953  France ................... 40/336

*Primary Examiner*—Kenneth J. Dorner
*Assistant Examiner*—C. Hope Davis
*Attorney, Agent, or Firm*—Lerner, David, Littenberg, Krumholz & Mentlik

[57] ABSTRACT

A display device which can be used in combination with, for example, telephones, computers, keyboards or other similar devices to conveniently display useful information such as speed dialing numbers. Also described is a combined device and display device and methods of using the display device described herein.

9 Claims, 5 Drawing Sheets

DEVICE FOR DISPLAYING INDICIA AND METHODS FOR ITS USE

FIELD OF THE INVENTION

The present invention relates to devices which can be used to display indicia, particularly devices which cooperate with housings. Methods of using these devices to conveniently display indicia are also to be considered as within the field.

BACKGROUND OF THE INVENTION

The invention of the telephone stands out as one of the most significant technological advancements of the twentieth century. Telephones and telecommunications are indispensable in today's everyday life. Certainly, the telephone is one of the focal points of both home and business environments. However, for as long as there have been telephones, there has been the need to make certain information conveniently accessible to the telephone user. Many have tried to satisfy that need. For example, U.S. Pat. No. 936,254 which issued on Oct. 5, 1909, relates to an attachment for older style wooden wall telephone. The attachment supported a pad of writing paper. The pad could be used for jotting down notes or for writing phone numbers, memoranda, etc.

Other devices followed, such as that disclosed in U.S. Pat. No. 2,624,965, which relates to a telephone indicia card holder for standard or conventional table top telephones. Conventional table top telephones have a base portion which includes a recess formed immediately beneath the cradle which retains the handset or receiver. The recess is accessible from the back of the telephone and is generally utilized for manually carrying the telephones. At the foremost extremity of the roof of the recess there is a projection adapted for manual engagement to prevent slippage of the fingers engaging the telephone base when carrying the telephone base by placing fingers in the recess and in contact with the roof. The patented card holder snaps onto the recess such that the information contained therein was displayed between the ridges forming the cradle for the receiver. Thus the information could be viewed when the handset or receiver was removed from the cradle.

A number of other inventions have also utilized this recess and the roof and ridge of conventional table top telephones to accommodate the attachment of accessories. These include rolodex style indexing accessories such as those described in U.S. Pat. No. 4,192,425, a pad such as described in U.S. Pat. No. 3,806,164, and various telephone display devices such as those described in U.S. Pat. Nos. 4,283,037 and D267,174. See also U.S. Pat. Nos. D242,808; 3,063,183; 3,184,548; 3,272,531; and 3,837,103.

Another accessory device which could be associated with a telephone is illustrated in U.S. Pat. No. D215,054, which relates to a combined telephone message holder and advertising display card or similar article. However, the device appears to be permanently attached to the back of a telephone by an adhesive region which is affixed to the body of a telephone base.

Attempts have also been made to accommodate the more modern design of today's telephones, many of which do not have the cradle and carrying recess of the more traditional table top telephones just discussed. One such device is illustrated in U.S. Pat. No. 4,448,383, which relates to an adjustable telephone message holder which is mounted on the top or cover portion of a telephone as opposed to within the carrying recess. Most of the devices previously described are, however, specifically limited, by their very design, to conventional table top telephones having a cradle for the receiver and a carrying recess disposed underneath the cradle.

Recent years have witnessed an explosion in the styles, shapes and varieties of telephone housing and many of these styles cannot accommodate telephone accessories such as those previously described. Some accessories require a permanent attachment or the affixation of certain material to the outer surface of a telephone which may be undesirable. Often such devices are permanent which precludes their use on, for example, leased or rented telephones. Still other devices are large and cumbersome and do not translate well into crowded office and home environments. Finally, many of the devices currently known are complicated and expensive to manufacture.

Along with the advent of new styles of telephone has come technology which has broadened the usefulness of telephones. Such services as multiple number memory have allowed for the automatic apportionment of phone call charges to specific billing accounts. Speed calling features allow the user, with the touch of a minimum number of buttons, to dial specifically identified persons. Interoffice exchanges allow for the dialing from one office to another without dialing the entire telephone number. With all these conveniences, however, the operator still needs some sort of sheet which contains a key reminding the user of, for example, the speed dial number for a particular person or the billing number for a particular client or the exchange number for someone in an office two floors below. Despite the number of accessories available and despite the technological advances in telephones, it is not unusual to find directories containing, for example, speed call numbers printed on a sheet of paper which is affixed to the wall behind the telephone, condensed and taped to the telephone or fixed on a table top adjacent to or beneath the telephone.

Thus, there remains a need for a convenient display device which is simple and easy to manufacture and which is removably associated with telephones of more current architecture. Such a device would need to be simple and convenient both in its presentation of indicia or the directory, its association with the telephone unit and the ability to change directories as information thereon is updated. A device which is simple and inexpensive to manufacture would also be highly desirable. Unlike the prior art, the present invention satisfies all of these needs.

OBJECTS AND SUMMARY OF THE INVENTION

It is an object of the present invention to provide a display device which can be used with telephones having at least a two part housing whether or not the housing also includes a cradle and the associated carrying recess.

Another object of the present invention is the provision of a device which can be used to display indicia, preferably in sheet form, such that the indicia containing sheets may be conveniently inserted, removed, and changed.

Another object of the present invention is the provision of a device which is simple to use and inexpensive to manufacture and which maintains the aesthetic qualities of the telephones to which it is attached.

Yet another object of the present invention is the provision of a telephone incorporating such a device and method of attaching such a device to a telephone.

These and other objects will be readily apparent from a review of this disclosure.

In accordance with these objects, there is provided an indicia display device for mounting to a housing of the type in which the housing has a base piece and a corresponding cover piece adapted to be joined to the base piece so as to form a seam. At least one of the base piece and the cover piece have a portion which is deformable. The device includes a display portion for displaying indicia. This includes a means defining a display support surface and means associated therewith for retaining a replaceable indicia containing sheet. The device also includes a tab portion. This portion has a tab disposed at an angle of about 90° or less to the display portion, the tab being of size and shape adapted to be inserted between the base piece and the cover piece of the housing at the seam and retained thereat. The tab portion is generally of insufficient size and shape to stand the display portion.

In a preferred embodiment of the device just described, the tab is of a size and shape sufficient to deform at least one of the base piece or the cover piece of the housing when inserted into the seam such that resistance is offered to the insertion and removal of the tab.

In another preferred embodiment, the housing has a base piece which includes a lip defining an opening into the interior of the base piece and a cover piece adapted to be joined to the base piece to close the opening. The cover includes a depending wall having an inner surface and an outer edge and is adapted to encompass at least a portion of the lip of the base piece when the cover is joined to the base piece in a manner such that the lip is disposed adjacent to the inner surface of the depending wall intermediate of the outer edge and on inner surface of the cover thereby forming a seam. At least a portion of the depending wall and the base piece are deformable so as to increase the distance between the lip and the inner surface of the depending wall. The tab of the device is of a size and shape adapted to be inserted between the lip and the inner surface of the depending wall and to deform at least one of the base piece or the depending wall such that at least one of the depending wall or the base piece offers resistance to the insertion and removal of the tab from the seam.

In another embodiment in accordance with the present invention there is provided a combination of a communications device and a display device for conveniently displaying indicia. The combination includes a telephone including a housing having a base piece and a cover piece joined to the base piece so as to form a seam. The combination also includes a generally "L" shaped display device having a display portion for displaying indicia, having means defining a display support surface and means associated with the display support surface for retaining a replaceable indicia containing sheet. The display device also includes a tab portion including a tab disposed at an angle of about 90° or less to the display portion, the tab inserted, engaged and retained in the seam and between the base piece and the cover piece.

Furthermore, in accordance with the present invention, there is provided a method of displaying indicia for use with a communications device. The method includes the steps of: providing a telephone including a housing having a base piece and a cover piece joined to the base piece so as to form a seam, at least a portion of the base piece or the cover piece being deformable; providing a generally "L" shaped display device including a display portion having a means defining a display support surface and means associated with the display support surface for retaining a replaceable indicia containing sheet, and a tab portion including a tab disposed at an angle of about 90° or less to the display portion, the tab being of size and shape adapted to be inserted into the seam and retained therein; and inserting the tab of the display device into the seam such that it is retained therein in such a way that the indicia can be conveniently viewed.

The device of the present invention is simple and may be constructed from inexpensive materials with a minimum of processing. Furthermore, the device in accordance with the present invention may be easily and conveniently associated with a device such as a computer or a telephone such that it provides convenient access to the indicia containing sheet retained thereby. Furthermore, the device of the present invention allows for the quick and easy removal of the device and/or removal or replacement of the sheet containing indicia such as a directory. Finally, the present invention provides a device which can be used with currently styled telephones such as those found in most offices. The present invention also relates to a method of using a device of the present invention and a telephone cooperating with this device.

BRIEF DESCRIPTION OF THE DRAWINGS

Preferred embodiments of the present invention will be described in greater detail with reference to the accompanying drawings, wherein like members bear like reference numerals and wherein.

DETAILED DESCRIPTION OF THE PREFERRED EMBODIMENT

The present invention provides an inexpensive, aesthetically appealing, and easily used display device for displaying information or indicia for the convenience of a user. "Indicia" includes, without limitation, a speed dial directory, internal phone directory, E-mail reference number directory, list of client or job numbers, directions or instructions as to the use of a device such as, for example, a computer or more particularly a telephone, and the like.

Figures 1, 2, 3:
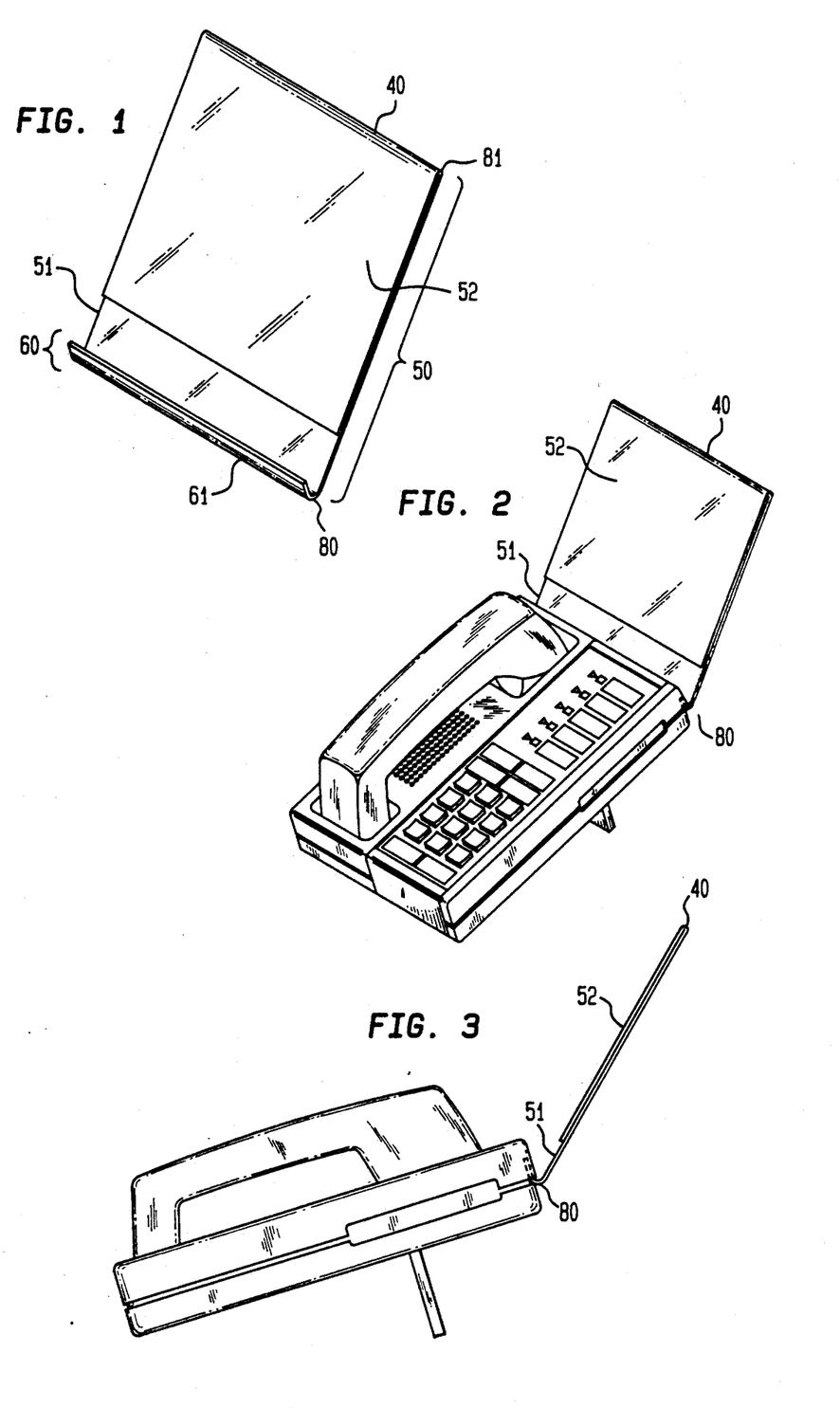
FIG. 1 is a perspective view of a preferred device in accordance with the present invention.
FIG. 2 a perspective view of a combination of a telecommunication device and a display device in accordance with the present invention.
FIG. 3 is a side view of the combined telecommunications device and a display device shown in FIG. 2.

With reference to FIG. 1, and in a preferred embodiment of the present invention, a display device 40 is provided having a generally "L" shape including a generally longer portion and a generally shorter portion disposed at an angle relative to each other. The longer portion of the display device 40 includes a display portion 50 for displaying indicia, and a tab portion 60 adapted to be inserted into the seam created in a housing by the joining of two adjacent housing pieces.

The display portion 50 includes a means defining a display support surface 51 and a means associated with the display support surface for retaining a replaceable indicia containing sheet 52. A sheet, such as a sheet of paper containing indicia is supported when placed onto the display support surface 51 and is retained in place thereon by the operation of the associated means for retaining replaceable indicia containing sheets 52.

As illustrated in FIGS. 1 through 3 and 9, the display support surface 51 is preferably composed of a plastic material and the associated means for retaining a replaceable indicia containing sheet 52 is preferably a flap 53 of clear plastic material. So configured, the display portion 50 of display device 40 is used by manipulating the free end of flap 53 away from display support surface 51. An indicia containing sheet is placed onto the display support surface 51. The indicia would face away from the display support surface and thus be viewable through flap 53. Flap 53 is then released such that it moves toward display support surface 51 thereby retaining the indicia containing sheet.

Figure 9:
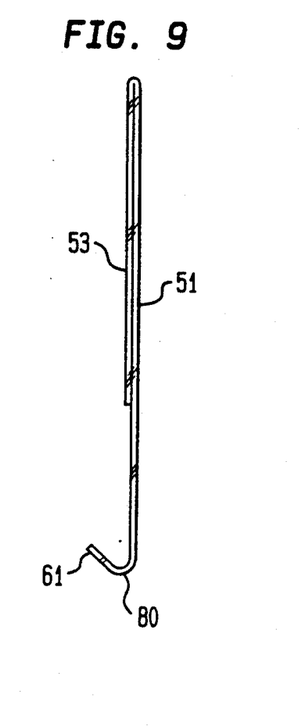
FIG. 9 is a side view of a display device of the present invention including a flap.
Figure 10:
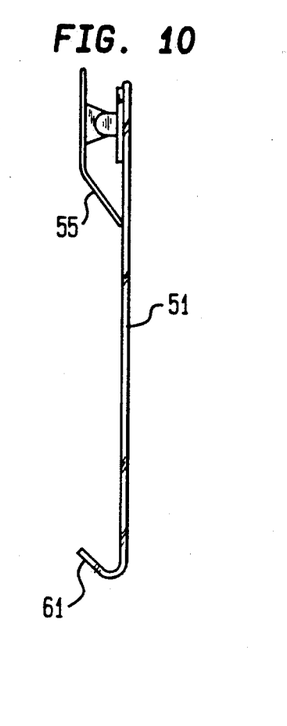
FIG. 10 is a side view of a display device of the present invention including a clip.
Figure 11:
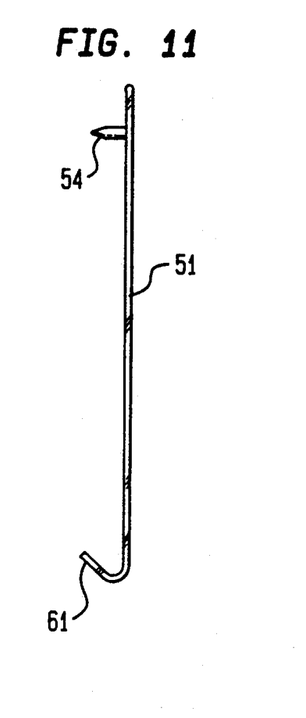
FIG. 11 is a side view of a display device of the present invention including a peg.
Figure 12:
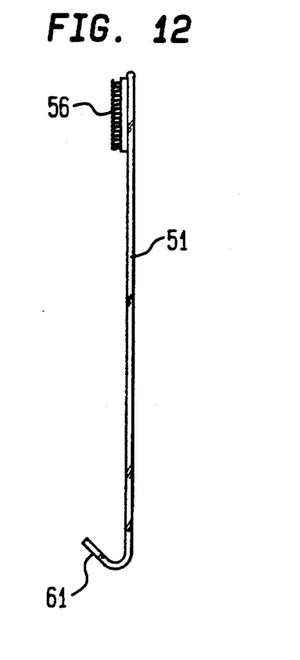
FIG. 12 is a side view of a display device of the present invention including a strip of releasable adhesive.
Figure 13:
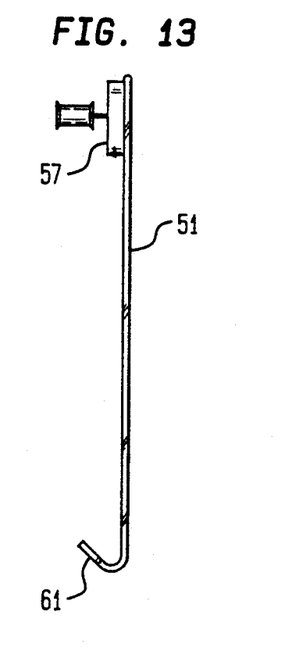
FIG. 13 is a side view of a display device of the present invention including a strip of cork and a tack.

It is, of course, necessary in accordance with this embodiment that flap 53 and display support surface 51 be manipulable with regard to each other and that, preferably, they remain in intimate contact with each other when not being manipulated or separated by an indicia containing sheet It is also necessary that the flap 53 and display support surface 51 be urged toward each other when not manipulated to separate them. This will insure the retention of the indicia containing sheet.

It is not necessary, however, that flap 53 be of the same dimension as the display support surface 51 and vice versa. Flap 53 may be wider or narrower than the display support surface 51 to, for example, accommodate larger sheets of indicia, or allow for the easy gripping and manipulation of these sheets for insertion or removal, respectively. Similarly, the display support surface 51 may, in certain embodiments, be advantageously narrower or wider with respect to the flap 53.

Neither the display support surface 51 nor the means associated therewith for retaining a replaceable indicia containing sheet 52 need be composed of essentially flat planar clear plastic members of a defined thickness. As will be readily apparent, the display support surface 51 could be a plurality of parallel rods joined at the top and bottom and having an indicia containing sheet retaining means 52 joined, operably and opposably, at one end thereof.

Similarly, and as illustrated in FIGS. 10 through 14, the means associated with the display support surface for retaining a replaceable indicia containing sheet 52 could be a peg 54, a clip such as found on a clipboard 55, a strip of releasable adhesive 56 such as used on Post-it ® brand notepads (registered trademark of 3M), a strip of cork or similar material and a tack 57, a hook 58 or the like. These would be mounted adjacent one end of display support surface 51 such that sheets containing indicia could be retained and suspended from the various retaining means 52 while being supported by the display support surface 51.

Figures 6, 7:
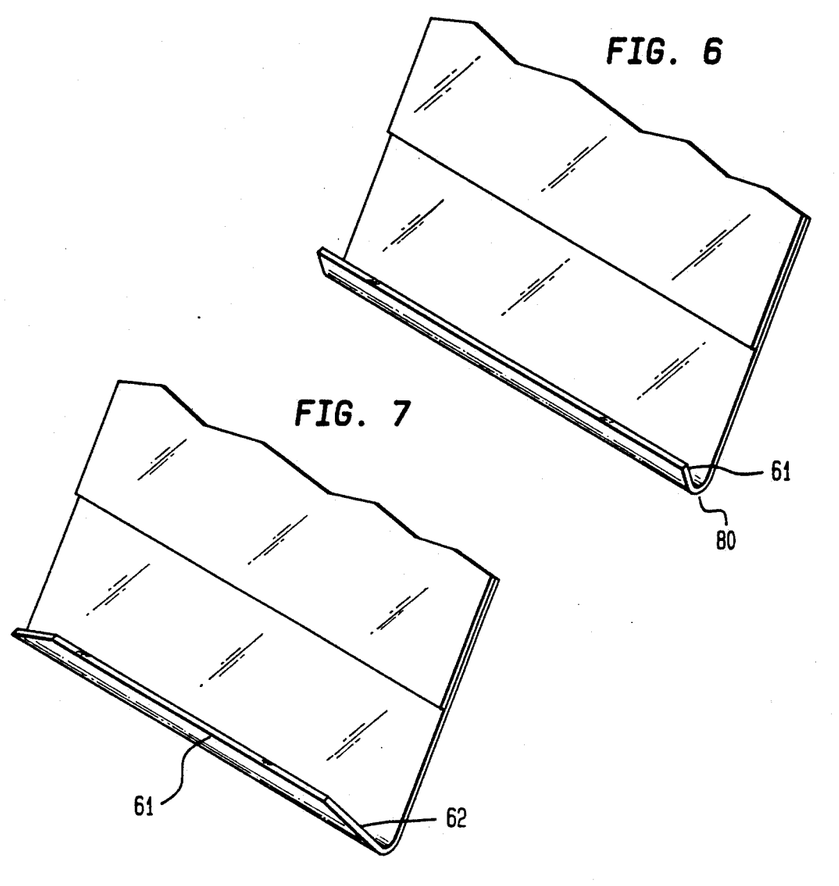
FIG. 6 is a perspective view of a tab portion of a display device of present invention.
FIG. 7 is a perspective view of another tab portion of a display device of the present invention.
Figure 8:
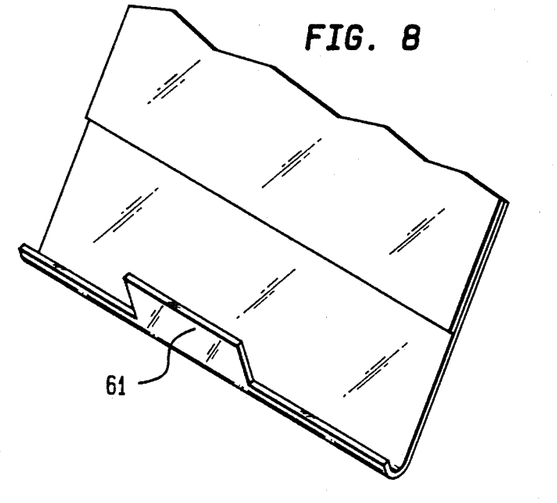
FIG. 8 is a perspective view of another tab portion of a display device of the present invention.

The device 40 of the present invention also includes a tab portion 60. The tab portion 60 includes a tab 61 which is disposed at an angle of about 90° or less relative to the display portion 50. Tab 61 is of a size and shape adapted to be inserted into a seam in a housing. As illustrated in FIG. 7, the tab may have tapered edges 62, or as shown in FIG. 8 may be larger (not shown) or smaller in width than the width of the display portion 50. Furthermore, tab 61 should be large enough to be inserted into a seam and be stably retained by the housing. However, tab 61 is generally of insufficient size and shape to allow for the display device 40 to be "stood up" using the tab portion 60 as a base member.

The overall shape of the tab is highly dependent upon the type of housing and the type of seam into which the device will be inserted. Thus the tab will be modified to accommodate the specifics of the seam's dimensions and other factors. Of course, the tab 61 generally should not be wider than the width of the seam into which it is to be inserted nor should it be so long as to prevent the stable retention of the display device 40 within the seam. Moreover, both the length of tab 61 and its thickness will depend, to a great deal, upon the type of housing into which the device 40 is inserted.

One type of housing might provide a seam which is really a gap which separates a portion of a first housing part or base piece and a second housing part or cover piece. While the base piece and cover piece may be joined together and may be in intimate contact elsewhere, in this type of housing the seam represents an area where the base piece and cover piece are adjacent, but not in intimate contact with each other. Under such circumstances, tab 61 may be of a thickness which will not cause the deformation of either the base piece or the cover piece. In essence, for insertion into a seam so constructed, tab 61 may be configured to neatly slip in between the base piece and cover piece and hooking inside the cover piece and is retained thereby. For such housing configurations, it is also advantageous to limit the length of tab 61 such that the junction of the tab portion 60 and the display portion 50 abuts the base piece adjacent to the seam when the device is inserted and retained in intimate contact with the housing.

Figure 4:
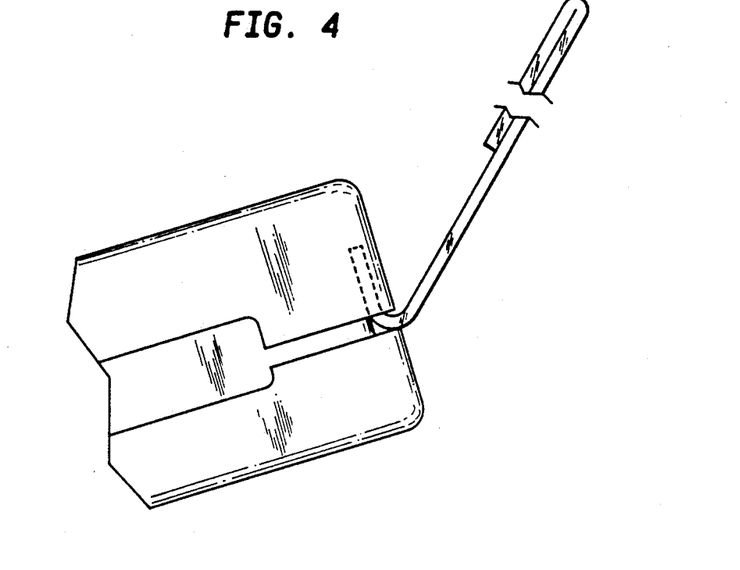
FIG. 4 is an exploded side view of a combined telecommunications device and a display device illustrating the position of a tab portion of the display device during the combination.

More often than not, however, a base piece and a cover piece meet and abut. (FIGS. 4 and 5) Under such circumstances, it is necessary to adjust the thickness of the tab such that it will deform, even if very slightly, at least a portion of the base piece and/or a portion of the cover piece surrounding the portion of the seam into which tab 61 is inserted. (FIG. 5A) It is also important that the thickness of tab 61 be such that it does not cause undue deformation of the housing or hinder insertion into the seam. Again, the length of tab 61 should be sufficient to cause deformation of at least a portion of the housing when inserted and be sufficient to be retained between the base piece and the cover piece. However, it may be preferable that the length of tab 61 be somewhat restricted such that the junction of the tab portion 60 and the display portion 50, or at least a portion thereof, is directly adjacent to, if not within, the seam when inserted.

Figure 5:
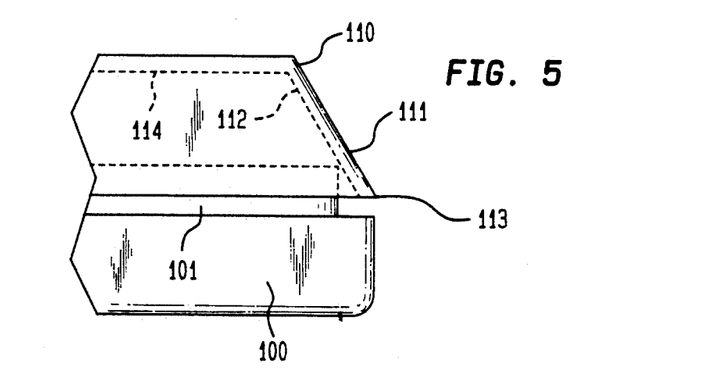
FIG. 5 is a side view of a portion of a housing.
Figure 5A:
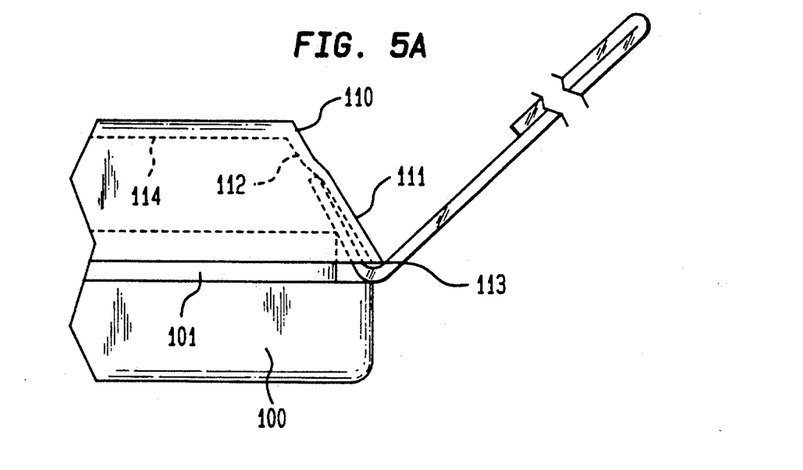
FIG. 5A a side view of a portion of a housing as illustrated in FIG. 5 wherein a display device in accordance with the present invention has been combined therewith, thus causing the deformation of a portion of the housing.

As illustrated in FIG. 5, some housings include a base piece having a lip 101 which defines an opening into the interior of the base piece. In such cases, the cover piece 110 is adapted to be joined to the base piece 100 to close the opening. The cover 110 generally includes depending walls 111 having an inner surface 112 and an outer edge 113 and the cover is adapted to encompass at least a portion of the lip 101 of the base piece 100 when the cover is joined to the base piece. In such configuration, the lip 101 is generally disposed adjacent to and in some cases touching the inner surface 112 of the depending wall 111 at a position intermediate of the outer edge 113 of the depending wall 111 and also intermediate of the inner surface of the cover 114.

The seam in housings of such construction therefore have a ledge and an associated overhang and the housing portions do not directly abut at corresponding edges. When considering the dimensions of tab 61 for accommodating such a seam, the design considerations previously enumerated are just as applicable. However, in addition, it is desirable to manipulate the dimensions of tab 61 such that the junction of tab portion 60 and display portion 5 rests within and is seated adjacent to the lip 101 and the bottom surface of the covered ledge. Of course, it is not necessary that the junction be so placed. In fact, the junction of the tab portion 60 and the display portion 50 could be located away from the housing entirely.

In addition, it may be necessary to adjust the dimensions of a tab 61 to accommodate special structure of a particular housing. For example, two housing members may be retained by a screw fastener which is perpendicular to the seam and which lies in the center of the portion of the seam into which the tab is to be inserted. The seam on either side of the fastener, however, remains sufficiently deformable to allow for insertion. In such cases, it may be necessary to cut a notch out of the center of the tab, thereby providing, in essence, two discreet tabs such that the device may be inserted around the screw fastener.

It is preferred that the relative angle at which the tab portion 60 and the display portion 50 are disposed relative to each other be about 90° or less. More preferably, the angle is between about 30° and about 75°. Most preferably, the angle should range from between about 55° and 65°.

The junction of the display portion 50 and the tab portion 60 is a transitionary region where both portions are interconnected at an angle as previously described. It is possible that a tab 61 could be glued or otherwise affixed or attached to one end of the display support surface 51 at a specific angle in accordance with the present invention. However, it is preferred that the tab portion 60 and at leas the display support surface 51 of display portion 50 be formed from a single sheet of material which has been deformed so as to provide a bend, fold, or angle therein. For simplicity, this bend or fold will be referred to as the first fold 80 as shown in FIGS. 6 and 15.

Figure 15:
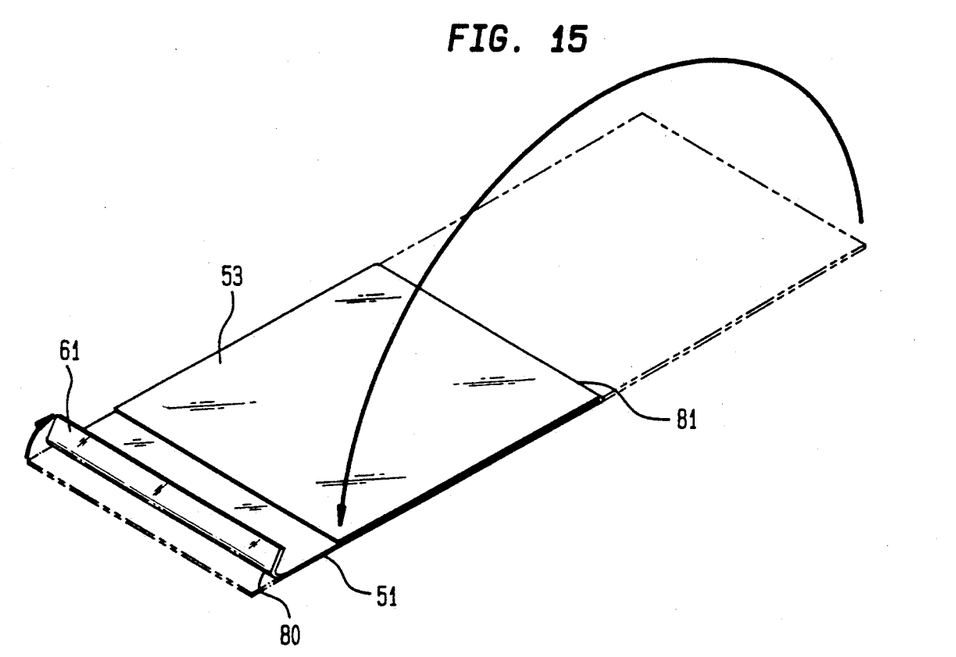
FIG. 15 is a perspective view of a display device of the present invention showing its origin from a single sheet of polymeric material.

Generally, and as illustrated in FIG. 15, first fold 80 is formed by applying heat to a portion of a single piece of heat deformable plastic or polymeric material such as a thermoset resin or a thermoplastic resin. This application of heat softens and renders workable a limited portion of the heated polymer material. The remaining polymeric material on either side of the heated region generally remains rigid and relatively inflexible. By manipulating these two rigid portions, a bend of a specific angle can be imparted along first fold 80.

Figure 14:
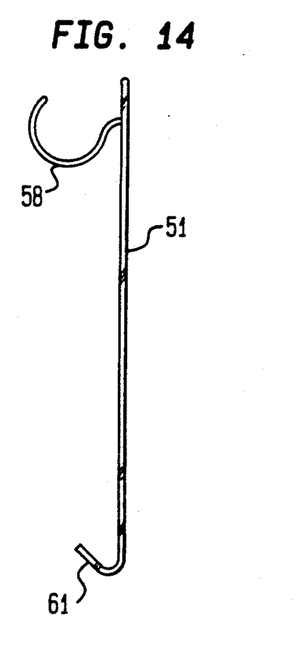
FIG. 14 is a side view of a display device of the present invention a hook.

The distance from first fold 80 to the shortest parallel end of the resulting material is the length of tab 61. At the other end of the now deformed polymer material, and specifically with regard to the side or edge thereof which is parallel to first fold 80, is mounted the means associated with the display support surface for retaining a replaceable indicia containing sheet 52. For example, as illustrated in FIG. 14, if retaining means 52 is a hook 58, then the hook 58 can be disposed adjacent to the end of the display support surface 51 which is opposed to but parallel to first fold 80. Attachment could be by the use of an adhesive or by drilling a hole in display support surface 51 and bolting the hook 58 thereto.

In a preferred embodiment as shown in FIGS. 9 and 15, however, the present invention utilizes a flap 53 as the means associated with the display support surface for retaining a replaceable indicia containing sheet 52. Flap 53 could be a clear piece of plastic which is glued or adhesively joined at one end to the end of display support surface 51 opposing but parallel to first fold 80. Preferably, however, and as illustrated in FIG. 15, flap 53 is made by imparting a second fold 81 to the same piece of polymer material forming tab 61 and display support surface 51.

As previously described and as illustrated in FIG. 15, folding or bending the polymer material can be advantageously done by applying heat to an area parallel to the edge of the display support surface 51 which is opposed to and parallel to first fold 80 in a region spaced apart from that edge. The position of second fold 81 is not as important as the positioning of first fold 80 as it does not play a role in determining the relative size and shape of tab 61. However, it is important that the resulting flap 53 be sufficiently long to be able to retain and protect an indicia containing sheet and yet be sufficiently short to allow for manipulation without engaging a housing into which display device 40 is inserted or engaging tab 61 if flap 53 is manipulated when the device 40 is not inserted in a housing. Thus, it is preferable that second fold 81 be located relatively closer to the edge of the polymeric material opposed to but parallel to first fold 80 than it is to the first fold 80. Second fold 81, unlike first fold 80 should be such that flap 53, when folded over, is retained in intimate contact with display support surface 51. Furthermore, second fold 81 should be sufficiently severe to insure that flap 53 and display support surface 51 are constantly urged toward each other. Thus it is only when flap 53 is manipulated, or an indicia containing sheet separates flap 53 from display support surface 51 that flap 53 and display support surface 51 are not in intimate contact.

The device of the present invention may be used in conjunction with any housing having a seam which can accommodate a device of the present invention, i.e. include the gap or at least a housing member which is sufficiently deformable to allow the device of the present invention to be inserted into the seam The housings of computer terminal screens, keyboards, musical instruments and telephones are particularly preferred.

The present invention also encompasses a communications device such as a table top telephone having a horizontal seam as illustrated in FIGS. 2 and 3 running across the back thereof such as AT&T Model 7406. A display device as illustrated in FIG. 1 or 9 can be constructed as previously described using a sheet of acrylic plastic having a thickness of 1/16", a length of 13" and a width of 6¼". Tab 61 has a length of ¾" and the angle separating tab 61 from display support surface 51 is about 60°. A device of such dimensions and so configured can be inserted into the horizontal seam running along the back of the telephone and as tab 61 is urged further up into the seam, such that the first fold 80 engages and abuts the seam's ledge, the display device 40 can be rotated such that tab 51 is brought into engagement with the inner surface of the depending wall of the cover piece of the housing. The range of movement of the display device 40 is thereby limited and the display device is therefore brought to rest. When insertion is completed, the display device looks like a normal extension of the telephone and provides an easily accessible display of indicia containing sheets placed between display support surface 51 and flap 53 and retained thereby.

The principles, preferred embodiments, and modes of operation of the present invention have been described in the foregoing specification. The invention which is intended to be protected herein, however, is not to be construed as limited to the particular embodiments disclosed, since these are to be regarded illustrative rather than restrictive. Variations and changes may be made by others without departing from the spirit and scope of the invention.

I claim:

1. A combination of a communication device and a display device for conveniently displaying indicia comprising:
    a means for communicating by telephone line including a housing for housing components therein having a base piece and a cover piece joined to said base piece so as to form a seam;
    a generally "L" shaped display device including a display portion for displaying indicia having means defining a display support surface and means associated with said display support surface for retaining a replaceable indicia containing sheet;
    and a tab portion including a tab means for removeable insertion into said seam disposed at an angle no greater than about 90° to said display portion, said tab means inserted, engaged and retained in said seam and between said base piece and said cover piece.

2. The combination communications device of claim 1 wherein at least a portion of said base piece and said cover piece is deformed around said tab means.

3. The combination communications device of claim 2 wherein said angle being between about 30° and about 75°.

4. The combination communications device of claim 3 wherein said tab means is tapered.

5. The combination communications device of claim 2 wherein said means associated with said display support surface for retaining a replaceable indicia containing sheet is selected from the group consisting of a flap, a tack, a hook, a clip, a band, a peg, an adhesive strip, and a groove.

6. The combination communications device of claim 1 wherein said angle being between about 30° and about 75°, wherein said display device is composed of a clear plastic material and wherein said means associated with said display support surface for retaining a replaceable indicia containing sheet is a clear plastic flap.

7. A method for displaying indicia comprising the steps of:
    providing a housing for housing components therein including a base piece and a cover piece joined to said base piece so as to form a seam, at least a portion of said base piece or said cover piece being deformable;
    providing a generally "L" shaped display device including a display portion having a means defining a display support surface and means associated with said display support surface for retaining a replaceable indicia containing sheet, and a tab portion including a tab means for removable insertion into said seam disposed at an angle no greater than about 90° to said display portion, said tab means being of size and shape adapted to be inserted into said seam and retained therein; and
    inserting said tab means of said display device into said seam such that it is retained therein in such a way that the indicia can be conveniently viewed.

8. The method of claim 7 wherein at least a portion of said base piece or said cover piece is deformed around said tab means when said tab means is inserted.

9. The method of claim 7 further comprising the step of retaining a replaceable indicia containing sheet by said means associated with said display support surface for retaining a replaceable indicia containing sheet.

* * * * *

UNITED STATES PATENT AND TRADEMARK OFFICE
CERTIFICATE OF CORRECTION

PATENT NO. : 5,276,986
DATED : January 11, 1994
INVENTOR(S) : Thomas

It is certified that error appears in the above-indentified patent and that said Letters Patent is hereby corrected as shown below:

On the title page, item [54] lines 1 and 2 and in column 1, lines 2 and 3, in the title insert --TELEPHONE HAVING REMOVABLE INDICIA DISPLAY,-- between the words "INDICIA" and "AND"; and the word "ITS" should read --THEIR--.

Column 5, line 56, after "sheet", insert --.--.
Column 7, line 68, "leas" should read --least--.
Column 9, line 4, after "seam", insert --.--.

Signed and Sealed this

Seventh Day of June, 1994

Attest:

BRUCE LEHMAN

Attesting Officer　　Commissioner of Patents and Trademarks